United States Patent [19]

Blankenship

[11] 4,159,547

[45] Jul. 3, 1979

[54] INCINERATOR URINAL

[75] Inventor: Ernest B. Blankenship, Dallas, Tex.

[73] Assignee: Research Products/Blankenship Corporation, Dallas, Tex.

[21] Appl. No.: 858,185

[22] Filed: Dec. 7, 1977

[51] Int. Cl.² ............................................ A47K 11/02
[52] U.S. Cl. ..................................... 4/111.1; 4/111.5; 4/306
[58] Field of Search ............................. 4/111.1–111.5, 4/305–306, 309

[56] References Cited

U.S. PATENT DOCUMENTS

| | | |
|---|---|---|
| 3,020,559 | 2/1962 | Blankenship .......................... 4/111.2 |
| 3,251,070 | 5/1966 | Blankenship .......................... 4/111.5 |
| 3,486,174 | 12/1969 | Nordstadt et al. .................... 4/111.5 |
| 3,649,970 | 3/1972 | Blankenship ............................. 4/305 |
| 3,921,227 | 11/1975 | Blankenship .......................... 4/111.5 |
| 3,943,579 | 3/1976 | Blankenship .......................... 4/111.5 |

*Primary Examiner*—Henry K. Artis
*Attorney, Agent, or Firm*—Wofford, Fails & Zobal

[57] ABSTRACT

An incinerator urinal having a drain tube extending from its bowl to its ashpan exteriorly of its incinerator chamber and a catalyst container located above the incinerator chamber which presents a large cross-sectional area of a heat activated catalyst to the flow of odor and which is easy to install and service.

9 Claims, 2 Drawing Figures

INCINERATOR URINAL

BACKGROUND OF THE INVENTION

1. Field of the Invention

This invention relates to an improved incinerator urinal.

2. Description of the Prior Art

U.S. Pat. No. 3,251,070 discloses an incinerator urinal. U.S. Pat. Nos. 3,943,579 and 3,921,227 disclose incinerator toilets.

SUMMARY OF THE INVENTION

It is an object of the present invention to provide an improved incinerator urinal having a drain tube extending from its bowl to a lower pan exteriorly of its incinerator chamber.

It is a further object of the present invention to provide an incinerator urinal having a catalyst container located above its incinerator chamber which presents a large cross-sectional area of a heat activated catalyst to the flow of odor and which is easy to install and service.

DETAILED DESCRIPTION OF THE INVENTION

Figure 1:
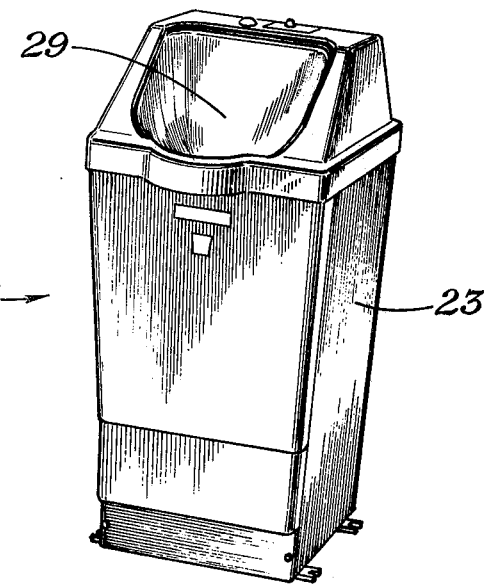
FIG. 1 is a perspective view of the incinerator urinal of the present invention.

Referring now to the drawings, the incinerator urinal of the present invention is identified at 21. It comprises a housing 23 having an enclosed compartment 25 and a funnel shaped bowl 27 having an enlarged opening 29 facing the front 31 of the urinal 21. Located in the compartment 25 below the bowl 27 is an incinerator chamber 33 supported to the housing by means not shown. The chamber 33 comprises circular inner and outer walls 35 and 37 forming an annulus in which is located heat insulation material 39. The outer wall 37 has integrally formed therewith a dish shaped wall 40 which forms the top of the incinerator chamber 33. The incinerator chamber 33 has an electrical heater coil 41 supported inside of the wall 35 by brackets 43. The lower end of the chamber 33 is open at 45 and is in fluid communication with a removable ashpan 47 which rests on a member 49 which is coupled to the base 51 of the housing. The pan 47 may be removed by removing the lower front panel 53 and pulling the pan 47 out by its handle 55. Snuggly fitted to the top of the chamber 37 is an inverted catalyst container 57 which is round in cross-section having about the same diameter as that of the incinerator chamber 33. The container 57 has a lower wall 59 which rests on the top edge of the incinerator chamber 33, an upper wall 61 and two spaced apart metal screens 63 and 65 which are connected to the side wall of the container 57. The screens 63 and 65 have apertures 63A and 65A formed therethrough and defined a disc shaped chamber in which is located a heat activated catalyst 67 which may be aluminum oxide ($Al_2O_3$) pellets. Screen 65 is spaced from wall 59 defining a lower air chamber 69 while screen 63 is spaced from the top wall 61 defining an upper air chamber 71.

Located between the chamber wall 40 and the container wall 59 is heat insulation material 73. Walls 40 and 59 and heat insulation material 73 have aligned apertures 75, 77, and 79 formed therethrough respectively defining inlet flow paths from the inside of the chamber 33 to the chamber 69. Formed through the top 61 of the container 57 is an outlet 81 which is located below a blower wheel 83 located in housing 85 and which is operated by an electric motor 87. The outlet of the blower housing 85 is coupled to a collar 89 which is adapted to a coupled to an exhaust vent (not shown).

Coupled to the bottom of the bowl 27 is a drain tube 91, preferably of copper, which extends exteriorly of the incinerator chamber 33 to the pan 47. As shown, the lower end of tube 91 is connected to an L shaped tube 93 which extends into the pan 47 through an aperture 95 formed through the wall of the pan. The aperture 95 is large enough to allow the pan 47 to be removed from the incinerator urinal and inserted back in place with the tube 93 extending through the aperture 95.

The tube 91 drains the urine from the bowl 27 to the pan 47. After use, the user presses a button 97 which actuates the heater coil 41 and blower motor 87 for a preset time period controlled by a timer (not shown). Heat is applied to the waste in the pan 47 by means of the heater coil 41 mounted above the waste. Waste does not contact the heater coil and, therefore, heater coil life is greatly increased.

Urine is evaporated and solids are subsequently dried and fired to leave only ash.

The blower wheel 83 draws air from the incinerator chamber 33 through the heat activated catalyst 67, through the outlet 81 and out through the collar 89 to the exhaust vent. The flow of air from the incinerator chamber 33 to the outlet 81 is by way of the inlet apertures formed through wall 40, heat insulation material 73, and wall 59, the lower chamber 69, apertures 65A, the heat activated catalyst 67, the apertures 63A, and the upper chamber 71. The purpose of the heat activated catalyst 67 is reduce to the odor as the air goes through the catalyst.

In one embodiment, the container 57 has a height of 5 inches and a diameter of about 10 inches. The layer of catalyst between screens 63 and 65 is about 1 inch thick with the chambers 69 and 71 each having a height of about 2 inches. The use of the catalyst container 57 as shown has advantageous over prior systems in that the cross-sectional area presented to the flow of the odor is much larger than heretofore possible, being about 78.54 square inches in cross-section or about three times larger than heretofore used. This increase in cross-sectional area allows for a much longer dwell time of the odor within the catalyst, thereby greatly enhancing the catalytic treatment of the odor. A second advantage resides in the fact that the construction is much simpler in concept than heretofore used and provides for easy installation both initially and in the field for servicing. Catalyst is poured between the screens 63 and 65 by means of a port not shown. In the field, catalyst may be added to the container by first removing the container 57 itself through the top portion of the urinal after removing the bowl and blower motor, opening the port, and pouring the catalyst through the port. The unit is reassembled in reverse.

Another improvement in the incinerator urinal of the present invention resides in the use of the tube 91 which extends from the bowl 27 to the pan 47 exteriorly of the incinerator chamber. This allows the tube 91 to remain cool and thereby prevents steamy and excessive corrosion as has been the case in the past where the drain tube penetrated the incinerator chamber directly from above. In addition, by having the drain tube 91 extend from the bowl 27 to the pan 47 exteriorly of the incinerator chamber, there is eliminated the sealing problem which otherwise results if the drain tube penetrates the catalyst container 57 and incinerator chamber directly from above.

Figure 2:
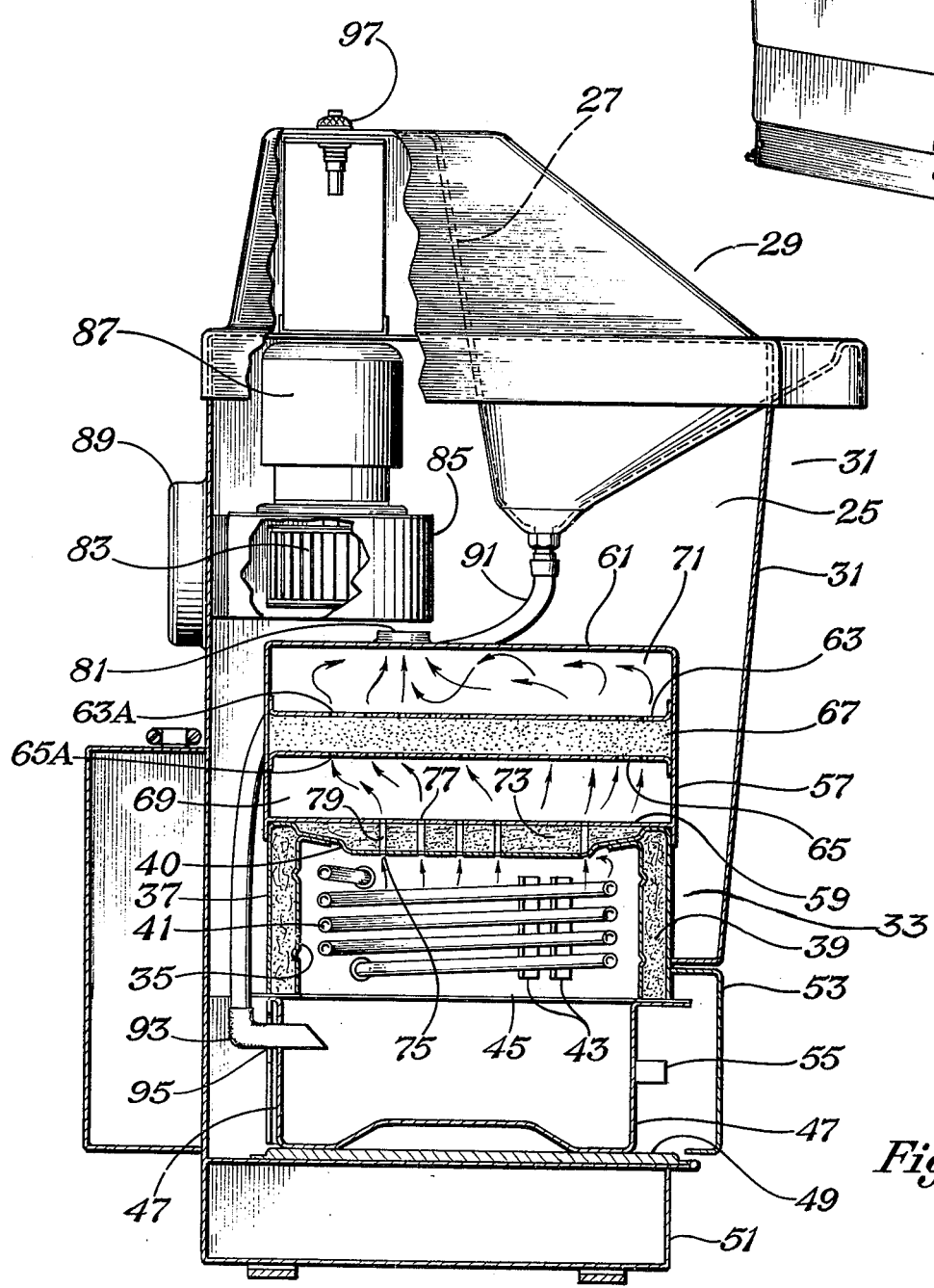
FIG. 2 is a cross-sectional side view of the incinerator urinal of FIG. 1.

The incinerator urinal of FIG. 2 may be modified by removing the dish shaped wall 40 of the chamber 33, the lower wall 59 of the container 57 and the heat insulation material 73. A small annular portion of the wall 59 may be retained to allow the container 57 to rest on the top edge of the chamber 33. In this embodiment, a substantial part of the screen 65 will be directly exposed to the inside of the incinerator chamber 33.

I claim:

1. An incinerator urinal, comprising:
   a housing,
   incinerator chamber means located in said housing,
   bowl means located above said incinerator chamber means for receiving liquid effluent,
   pan means adapted to be located below said incinerator chamber means and in fluid communication with said incinerator chamber means,
   a drain tube located exteriorly at said incinerator chamber means and extending from the lower end of said bowl means to said pan means exteriorly of said incinerator chamber means for allowing the flow of liquid effluent from said bowl means to said pan means,
   heater means for applying heat to the effluent deposited in said pan means, and
   a heat activated catalyst for reducing the odor of said effluent during operation of said heater means.

2. The incinerator urinal of claim 1 comprising:
   container located above said incinerator chamber means and having an inlet end,
   outlet means formed through the wall of said container means,
   a catalyst chamber section located between said inlet end and said outlet means,
   said catalyst chamber section comprising spaced apart first and second walls having apertures formed therethrough respectively for holding a heat activated catalyst therebetween,
   said second wall being spaced from said outlet means defining an upper chamber between said second wall and said outlet means, and
   gas removal means for drawing gases from said incinerator chamber means by way of said heat activated catalyst located in said catalyst chamber.

3. An incinerator urinal comprising:
   a housing,
   incinerator chamber means located in said housing,
   bowl means located above said incinerator chamber means for receiving liquid effluent,
   pan means adapted to be located below said incinerator chamber means and in fluid communications with said incinerator chamber means,
   drain tube means for allowing the flow of liquid effluent from said bowl means to said pan means,
   heater means for applying heat to the effluent deposited in said pan means,
   said incinerator chamber means having an upper end and a lower end,
   removable container means adapted to rest on said upper end of said incinerator chamber means, the lower end of said container means defining an inlet end,
   outlet means formed through the wall of said container means,
   a catalyst chamber section located between said inlet end and said outlet means,
   said catalyst chamber section comprising spaced apart first and second walls having apertures formed therethrough respectively for holding a heat activated catalyst therebetween for reducing the odor of said effluent during operation of said heater means,
   said first wall being spaced from said inlet end defining a lower chamber between said inlet end and said first wall,
   said second wall being spaced from said outlet means defining an upper chamber between said second wall and said outlet means, and
   gas removal means for drawing gases from said incinerator chamber means by way of said heat activated catalyst located in said catalyst chamber.

4. The incinerator urinal of claim 3 comprising:
   heat insulation means located between said lower chamber and said incinerator chamber means, and
   inlet means formed through said heat insulation means and extending from said incinerator chamber means to said lower chamber.

5. The incinerator urinal of claim 3 wherein:
   said container means has a size sufficient to cover said upper end of said incinerator chamber means,
   said container means having an upper wall with a single aperture formed therethrough defining said outlet means.

6. The incinerator urinal of claim 2 wherein:
   said incinerator chamber means has an upper end and a lower end,
   said container means comprising a removable container means adapted to rest on said upper end of said incinerator chamber means,
   the lower end of said container means defining said inlet end.

7. The incinerator urinal of claim 2 wherein:
   said incinerator chamber means has an upper end and a lower end,
   said container means having a size sufficient to cover said upper end of said incinerator chamber means,
   said container means having an upper wall with a single aperture formed therethrough defining said outlet means.

8. The incinerator urinal of claim 6 wherein:
   said container means has a size sufficient to cover said upper end of said incinerator chamber means,
   said container means has an upper wall with a single aperture formed therethrough defining said outlet means.

9. An incinerator urinal comprising:
   a housing,
   incinerator chamber means located in said housing,
   said incinerator chamber means having a central opening,
   bowl means located above said incinerator chamber means for receiving liquid effluent,
   pan means adapted to be located below said incinerator chamber means and in fluid communications with said central opening of said incinerator chamber means,
   drain means for allowing the flow of liquid effluent from said bowl means to said pan means, heater means located in said central opening of said incinerator chamber means for applying heat to the effluent deposited in said pan means, removable container means located above said incinerator chamber means and having an inlet end, outlet means formed through the wall of said container means, a catalyst chamber section located between said inlet end and said outlet means, said catalyst chamber section comprising spaced apart first and second walls having apertures formed thereto respectively for holding a heat activated catalyst therebetween for reducing the odor of said effluent during operation of said heater means, said first wall being spaced from said inlet end defining a lower chamber between said inlet end and said first wall, said lower chamber being in fluid communication with said central opening of said incinerator chamber means, said container means having an upper chamber located above said second wall, said outlet means providing a passage from said upper chamber through the wall of said container means, the horizontal cross-sectional area of said catalyst chamber section and of each of said lower and upper chambers being at least as great as the horizontal cross-sectional area of said central opening of said incinerator chamber means, and gas removal means for drawing gases from said central opening of said incinerator chamber means by way of said lower chamber, said heat activated catalyst located in said catalyst chamber, said upper chamber, and said outlet means.

* * * * *